US011842041B2

(12) United States Patent
Weber et al.

(10) Patent No.: US 11,842,041 B2
(45) Date of Patent: *Dec. 12, 2023

(54) TOUCH SCREEN LIGHTING SYSTEM CONTROLLER

(71) Applicant: HLI SOLUTIONS, INC., Greenville, SC (US)

(72) Inventors: Theodore E. Weber, Round Rock, TX (US); Timothy E. Willis, Clemson, SC (US); Christopher Lane Bailey, Greenville, SC (US)

(73) Assignee: HLI SOLUTIONS, INC., Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,028

(22) Filed: Nov. 4, 2022

(65) Prior Publication Data

US 2023/0229295 A1 Jul. 20, 2023

Related U.S. Application Data

(63) Continuation of application No. 16/400,389, filed on May 1, 2019, now Pat. No. 11,494,066.

(Continued)

(51) Int. Cl.
*G06F 3/04847* (2022.01)
*G06F 3/04886* (2022.01)
(Continued)

(52) U.S. Cl.
CPC ...... *G06F 3/04847* (2013.01); *G06F 3/04886* (2013.01); *H05B 47/175* (2020.01); *H05B 45/20* (2020.01)

(58) Field of Classification Search
CPC .............. G06F 3/0488; G06F 3/04847; G06F 3/04886; H05B 45/20; H05B 47/175
See application file for complete search history.

(56) References Cited

U.S. PATENT DOCUMENTS

D916,121 S 4/2021 Tagele
D918,952 S 5/2021 Pei
(Continued)

OTHER PUBLICATIONS

Chinese Patent Office Action for Related Application No. 201980044307.2 dated Jul. 1, 2022 (9 pages, including an English statement of relevance).

(Continued)

*Primary Examiner* — Alexander H Taningco
*Assistant Examiner* — Pedro C Fernandez
(74) *Attorney, Agent, or Firm* — Buckley, Maschoff & Talwalkar LLC

(57) ABSTRACT

A system including an electronic processor, a transceiver communicatively coupled to the electronic processor, a display communicatively coupled to the electronic processor and a non-transient memory medium communicatively coupled to the electronic processor. The electronic processor is configured to generate a graphical representation based on at least one configuration file, the graphical representation including a button, present the graphical representation on the display, receive, via the display, a user input indicative of selecting the button, and transmit, via the transceiver, a lighting system control command based selection of the button.

19 Claims, 8 Drawing Sheets

Related U.S. Application Data

(60) Provisional application No. 62/665,692, filed on May 2, 2018.

(51) Int. Cl.
*H05B 47/175* (2020.01)
*H05B 45/20* (2020.01)

(56) References Cited

U.S. PATENT DOCUMENTS

| | | |
|---|---|---|
| D928,801 S | 8/2021 | Yoshioka |
| D929,411 S | 8/2021 | Douglas |
| D929,429 S | 8/2021 | Patel |
| 2006/0290710 A1 | 12/2006 | Zwanenburg |
| 2011/0178650 A1 | 7/2011 | Picco |
| 2013/0257315 A1* | 10/2013 | Restrepo ............... H05B 47/10 307/112 |
| 2015/0305115 A1* | 10/2015 | Vora .................... H05B 47/175 340/12.22 |
| 2017/0023995 A1 | 1/2017 | Liepold et al. |
| 2017/0220236 A1 | 8/2017 | Kwon |
| 2017/0339770 A1* | 11/2017 | Kim ...................... H05B 47/16 |

OTHER PUBLICATIONS

International Search Report and Written Opinion for Related Application No. PCT/US2019/030153 dated Jul. 19, 2019 (13 pages).

* cited by examiner

TOUCH SCREEN LIGHTING SYSTEM CONTROLLER

RELATED APPLICATIONS

This application claims priority to U.S. patent application Ser. No. 16/400,389, filed on May 1, 2019, which claims priority to U.S. Provisional Patent Application No. 62/665,692, filed on May 2, 2018, the entire contents of both of which are incorporated herein by reference.

FIELD

Embodiments described herein relate to controlling room lighting, and, more particularly, to the control of lighting systems using a touch screen lighting system controller.

SUMMARY

One embodiment discloses a system including an electronic processor, a transceiver communicatively coupled to the electronic processor, a display communicatively coupled to the electronic processor, and a non-transient memory medium communicatively coupled to the electronic processor. The electronic processor is configured to generate a graphical representation based on at least one configuration file, wherein the configuration file identifies the graphical representation selected from among a plurality of graphical representations presented to a user, present the graphical representation on the display, receive at least one updated configuration file, generate, based on the graphical representation and the updated configuration file, an updated graphical representation including control functionality based on the updated configuration file, present, on the display, the updated graphical representation, receive a user input indicative of a selection, and transmit, via the transceiver, a lighting system control command based the selection.

Another embodiment discloses a system including an electronic processor, a transceiver communicatively coupled to the electronic processor, a display communicatively coupled to the electronic processor, and a non-transient memory medium communicatively coupled to the electronic processor. The electronic processor is configured to retrieve, from the non-transient memory medium, the at least one configuration file, generate a graphical representation based on the at least one configuration file, the graphical representation including a combined control, the combined control including an x-axis, a y-axis, and a selector dot positioned at a first position, present the graphical representation on the display, receive a user input indicative of an x value and a y value, generate an updated graphical representation based on the user input, wherein the selector dot is positioned at a second position based on the x value and the y value, present, on the display, the updated graphical representation, and transmit, via the transceiver, a lighting system control command, the lighting system control command including a correlated color temperature value based on the x value and a dimmer level based on the y value.

Other aspects of the application will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
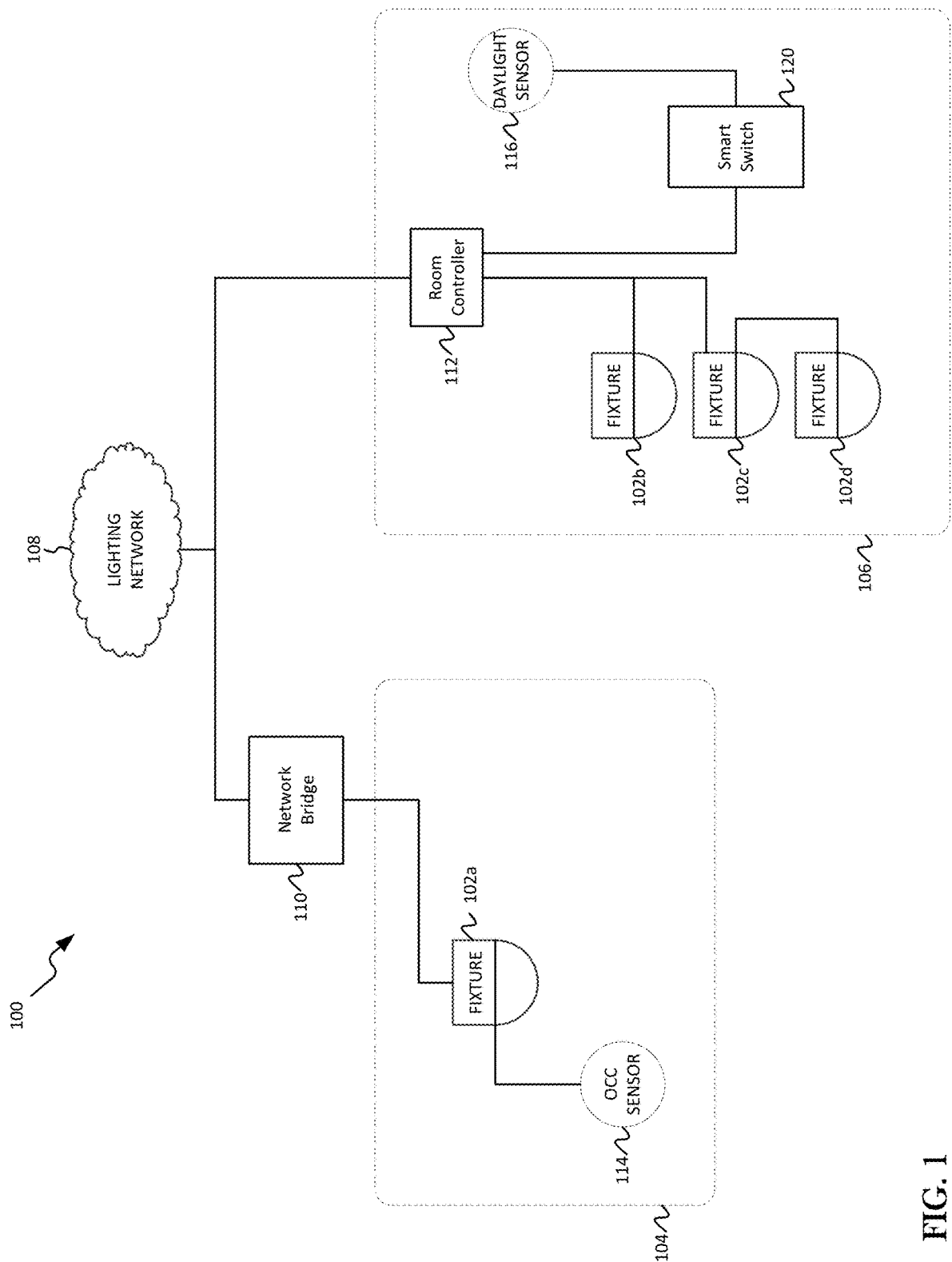
FIG. 1 schematically illustrates lighting control system, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments presented herein provide, among other things, a touch screen lighting system controller (smart switch) for configuring and controlling lighting fixtures.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 schematically illustrates an example embodiment of a lighting control system 100. The system 100 includes one or more lighting fixtures 102a—d (e.g., light-emitting diode (LED) lighting fixtures). The system 100 may be configured to control the lighting fixtures 102a—d, as well as other electrical loads (not shown), for rooms or zones; multiple rooms or zones that are combined into areas; and/or multiple areas (for example, rooms 104 and 106). In some embodiments, the lighting system 100 operates to control electrical loads across entire buildings and grounds that are separated by rooms, hallways, and/or exterior areas. In some embodiments, lighting system 100 employs an area/zone/group assignment strategy. In some embodiments, lighting fixtures 102a—d and/or other devices may be programmed to participate in only one area; however, they may belong to one or all of the available zones and groups within the area. Assignments in the areas, zones, and groups can be made through a commissioning tool (e.g., a computer program). In some embodiments, areas are used as a method of separating buildings or floors, zones to separate individual room or locations of control, and groups to configure control assignments within the rooms or locations.

The lighting fixtures 102a—d and other devices in the system 100 are communicatively coupled to and participate in a lighting fixture network 108. The lighting fixture network 108 includes wired networks (for example, Ethernet, RS-485, HubbNET™, and the like), wireless networks (for example, Wi-Fi™ and Bluetooth™, and the like), and combinations of the foregoing. In some embodiments, the lighting fixture network 108 includes area controllers (for example, a Hubbell® NXAC-120 NX Area Controller) and other devices that operate according to the NX Distributed Intelligence™ lighting control platform by Hubbell®. In some embodiments, the lighting fixtures 102a—d and sensors are connected to the network bridge 110 and the room controller 112 over a bus using the RS-485 serial communication standard that includes one or more conductors connecting the devices in a daisy chain or multi-drop configuration. In some embodiments, the illustrated devices connect to the bus using Hubbell® NX Smart Port™ technology.

In the illustrated embodiment, the system 100 also includes a network bridge 110 (for example, a Hubbell® NXHNB2 Network Bridge Module) and a room controller 112 (for example, a Hubbell® NXRC-2RD-UNV Room Controller). The network bridge 110 operates to connect the lighting fixture 102a and an occupancy sensor 114 to the lighting fixture network 108. In some embodiments, the lighting fixture 102a and the occupancy sensor 114 are controlled by or communicate with the room controller 112. In some embodiments, the lighting fixture 102a and the occupancy sensor 114 are controlled by another controller (not shown) via the lighting fixture network 108. In some embodiments, the lighting fixture 102a includes an integral controller. The occupancy sensor 114 detects occupants within an area. In some embodiments, the occupancy sensor 114 detects occupants using a passive infrared sensor (PIR). The room controller 112 operates to provide local control of the devices in the room 106 (that is, the lighting fixtures 102b-d, the daylight sensor 116, and the smart switch 120). The daylight sensor 116 senses light levels (for example, using a photodiode element).

Figure 2:
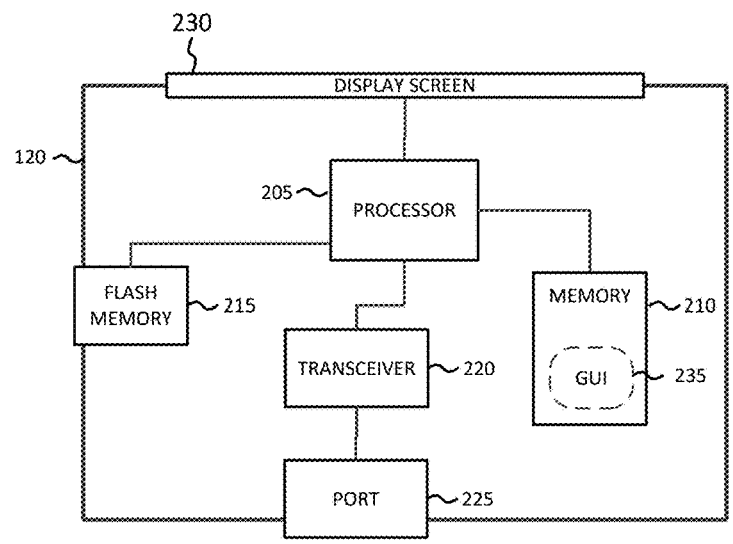
FIG. 2 schematically illustrates a smart switch, according to some embodiments.

The smart switch 120, described more particularly below with respect to FIG. 2, is a lighting system control panel, which may be configured to control the lighting fixtures 102a-d.

FIG. 2 schematically illustrates an example embodiment of the smart switch 120. In the illustrated embodiment, the smart switch 120 includes an electronic processor 205, a memory 210, a flash memory 215, a transceiver 220, a port 225, and a display screen 230. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the flash memory 215), and processes the information by executing one or more software instructions or modules, capable of being stored, for example, in a random access memory ("RAM") area of the memory 210 or a read only memory ("ROM") of the memory 210, the flash memory 215, or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, a graphical user interface (GUI) 235 (described below).

As noted, the smart switch 120 may be used to control elements of the system 100. The smart switch 120 presents virtual controls (using graphics, text, animations, and the like) on the display screen 230. A user can manipulate the virtual controls (for example, using touch-screen gestures such as touches, taps, presses, drags, swipes, and the like) to control, for example, lighting fixtures and/or other loads. Much of the behavior of the smart switch 120 may be customized using configuration files and graphics that are stored in the flash memory 215. In some embodiments, the flash memory 215 is a removable non-transitory computer readable medium (for example, a microSD flash memory card). When the flash memory 215 is inserted into the smart switch 120, the electronic processor 205 automatically loads the configuration files and graphics from the flash memory 215. In some embodiments, when an empty flash memory 215 is inserted into the smart switch 120, the electronic processor 205 automatically creates default configuration files. The configuration files, whether default or custom, may be edited, for example, by inserting the flash memory 215 into a reader connected to a computing device and using a text editor to modify and save the configuration files. Similarly, graphic files may be loaded onto the flash memory 215, allowing users of the smart switch 120 to customize the interface with custom logos, icons, and text.

In some embodiments, the configuration file is received from an external device, such as but not limited to a smart phone, a tablet, and/or an external computer (including an external server). In such an embodiments, the configuration file may be received via a network, including a wired network and/or a wireless network. The configuration file may also be received via a wireless communication protocol, such as but not limited to, Bluetooth, WiFi, and ZigBee. In some embodiments, the configuration file may be received via short message service (SMS).

The configuration files identify which control screens are presented to the user, and specifically what control functionality gets presented to the user. In some embodiments, the configuration of the smart switch 120 is provided The electronic processor 205 sends and receives data to and from the devices in the system 100 via the transceiver 220 and port 225. The transceiver 220 is communicatively coupled to the electronic processor 205 (e.g., via an integrated serial or I/O port) and is configured to send and receive communications on one or more buses using a suitable protocol. In some embodiments, the transceiver 220 is an RS-485 transceiver and the port 225 is an RJ-45 connector. In some embodiments, the smart switch 120 draws operating power from the bus via the port 225.

The display screen 230 is a suitable touch screen display, for example, a liquid crystal display (LCD) touch screen, or an organic light-emitting diode (OLED) touch screen. The smart switch 120 implements the graphical user interface (GUI) 235 (for example, generated by the electronic processor 205, from instructions and data stored in the memory 210, and presented on the display screen 230), that enables a user to interact with the smart switch 120 to control, among other things, the lighting fixtures 102a-d.

Figure 3:
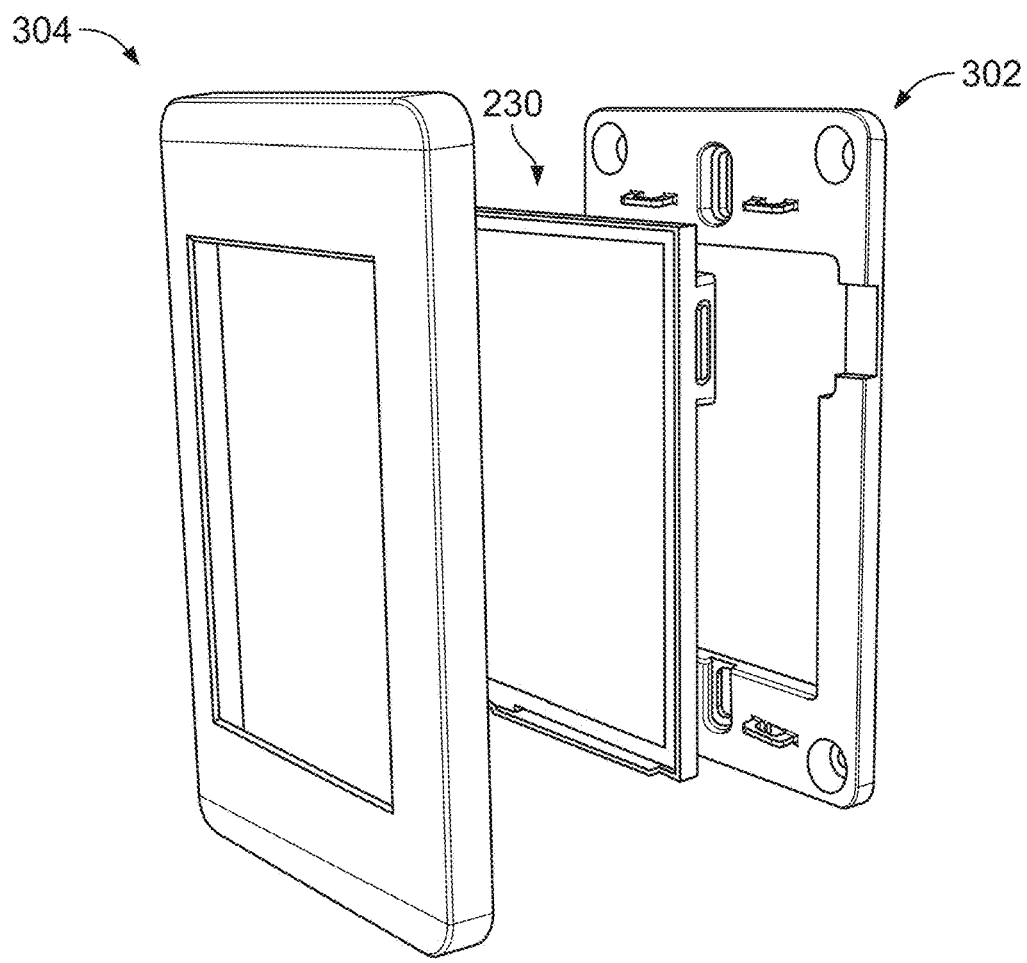
FIG. 3 illustrates an exploded view of the smart switch of FIG. 2, according to some embodiments.

FIG. 3 illustrates an exploded view of the smart switch 120 and some example mounting hardware according to some embodiments. The smart switch 120 may be configured for mounting, for example, in a single gang outlet box, using a mounting plate 302 and a bezel 304. In some embodiments, the display screen 230 is removable from the smart switch 120.

Figure 4:
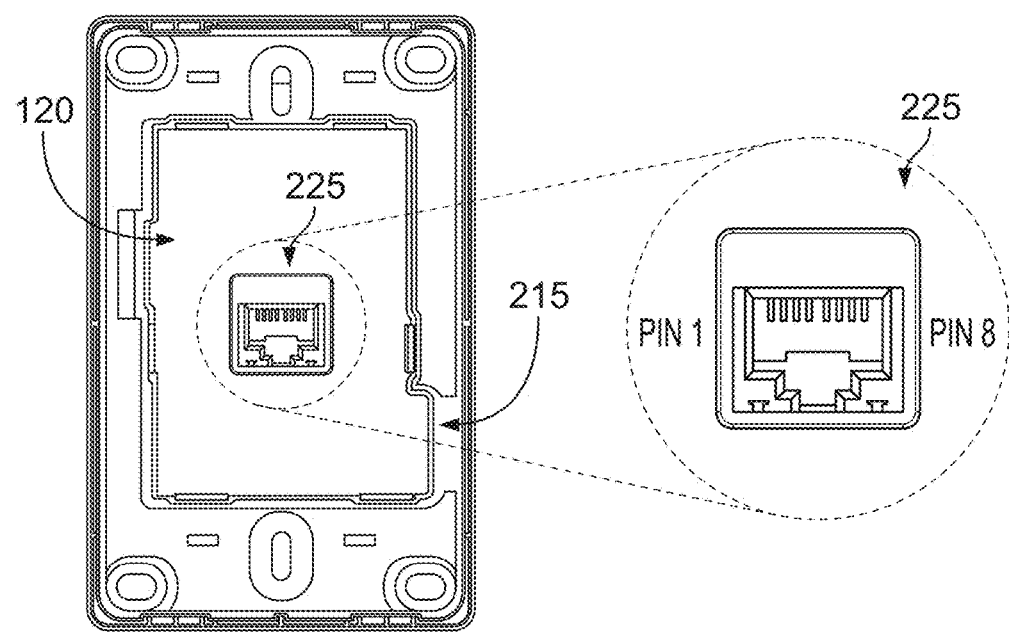
FIG. 4 illustrates a rear view of the smart switch of FIG. 2, according to some embodiments.

FIG. 4 illustrates a rear view of the smart switch 120, including a close-up view of the port 225. As illustrated, the flash memory 215 is positioned on an outer edge of the smart switch 120, so as to be user-accessible when the bezel 304 is removed. In some embodiments, the bezel 304 provides an access door, an opening, or another suitable means of providing user access to the flash memory 215. As illustrated in FIG. 4, the port 225 is an eight pin port. In some embodiments, the pins have functions as described below in Table 1.

TABLE 1

RJ45 Pinout

| Pin | Symbol | I/O | Description |
| --- | --- | --- | --- |
| 1 | VIN | P | 6.3 V to 36 VOC Input. Recommended range is 12 V to 24 V. This is the primary power source of the 4Disco11ery. |
| 2 | A | I/O | 485 A Signal, pulled to 3.3 V internally, terminated to B with 120 ohm |
| 3 | B | I/O | 485 B Signal, pulled to GND internally, terminated to B with 120 ohm |
| 4 | GND | P | System Ground, relevant to VIN and SV_IN |
| 5 | GND | P | System Ground, relevant to VIN and SV_IN |
| 6 | SV_IN | P | 5.0 VDC Input. This is typically only used to power the 4Disoovery from the 4D 485 Programmer, however can be used to power the 4Discovery is a higher voltage power source into VIN is not available. Should be in the range of 4.5 V to 5.5 V, nominal 5.0 V |
| 7 | TURN | I | Primarily used by the 4D 485 Programmer in conjunction to programming the 4Discovery, however can also be from an external device which is acting as Host when 4Discovery is programmed to be a slave. This is an input only to the 4Discovery. When 4Discovery is a Master, the slaves have to determine the direction of transmit/receive themselves using an Auto Turnaround 485 IC or circuit. |
| 8 | RESET | I | Reset signal used by the 4D 485 Programmer. Can be used by an external device if the 4Discovery needs to be reset. Active Low | remotely, for example, from the room controller 112, a portable electronic device running a suitable configuration application, or another remote device or system. In some embodiments, the smart switch 120 polls the system 100 to learn the functional capabilities of the various fixtures and modifies its configuration accordingly. For example, if no fixture has color tuning capability, then there is no need to present controls for color temperature.

Figure 5:
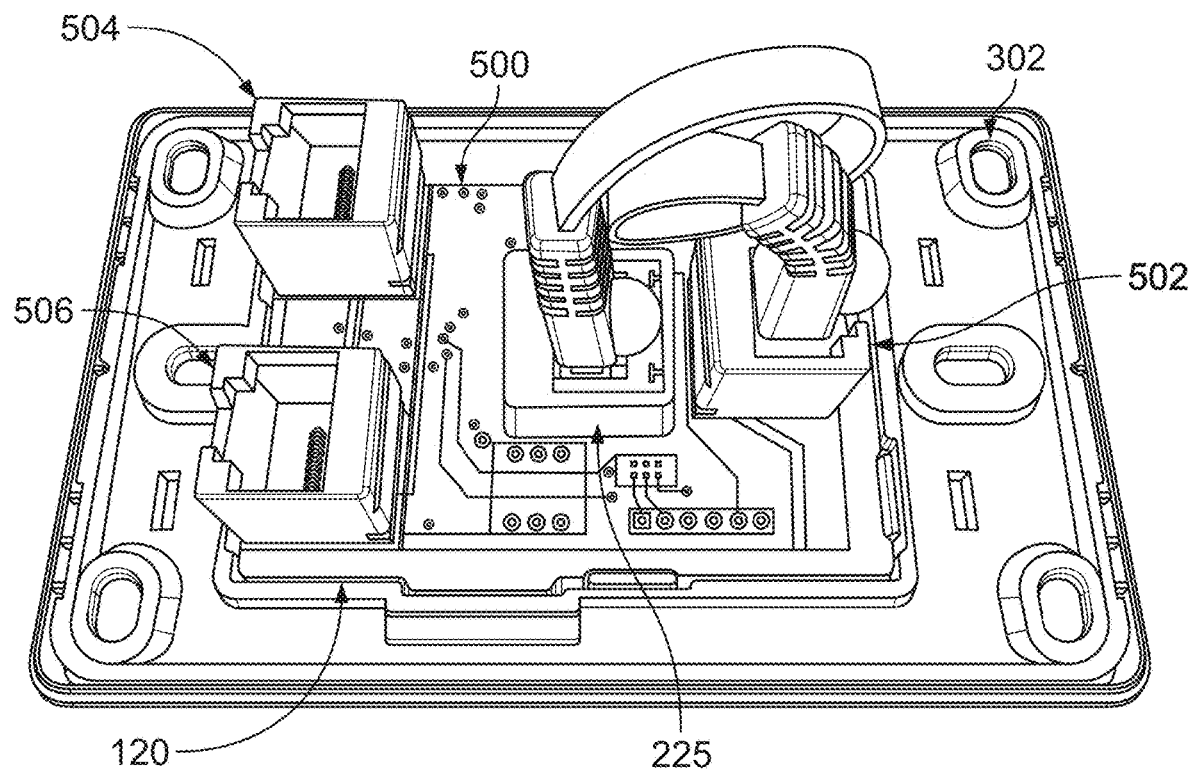
FIG. 5 illustrates a perspective view of the smart switch of FIG. 2 equipped with a smart port interface board, according to some embodiments.

As illustrated in FIG. 5, in some embodiments, the smart switch 120 may be equipped with a smart port interface board 500. The smart port interface board 500 attaches to the rear of the mount plate 302. The smart port interface board 500 includes a PCB board, including an opening that fits over and surrounds the port 225. The smart port interface board 500 also includes a port 502, for interfacing with the electronic processor 205 via the port 225, and two smart ports 504 and 506 (for example, Hubbell® NX Smart Ports™). Using the smart port interface board 500, the smart switch 120 can be installed inline on a suitable RS-485 bus.

Figure 6:
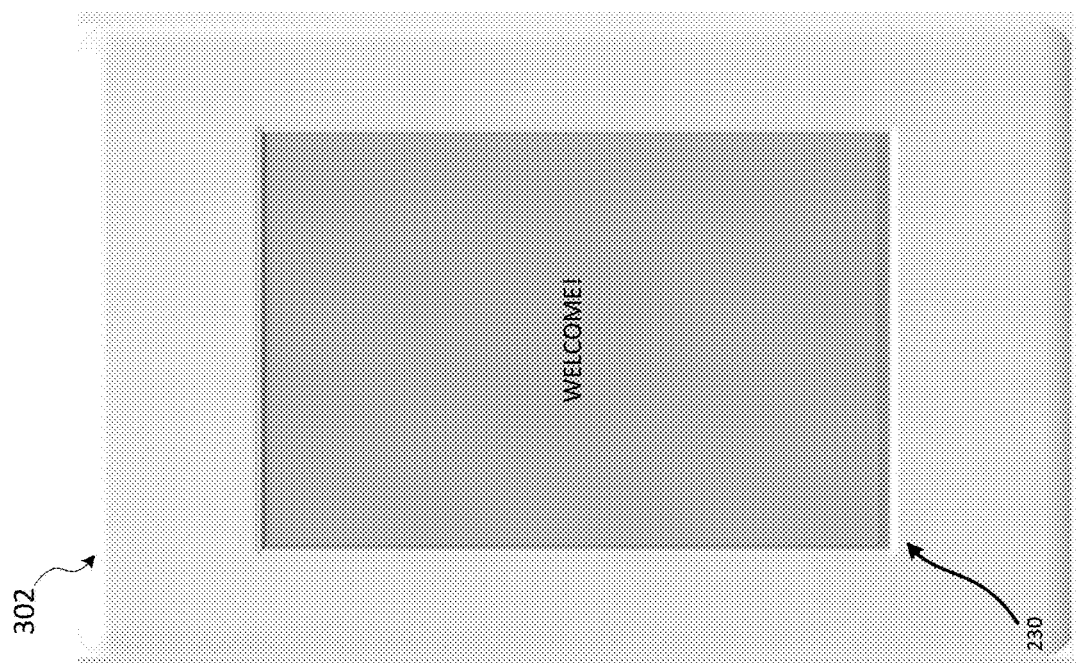
FIG. 6 illustrates a front view of the smart switch of FIG. 2, according to some embodiments.

FIG. 6 illustrates a front view of the smart switch 120. In the embodiment illustrated, the display screen 230 shows a splash screen, which displays upon power up, while the electronic processor 205 loads the configuration files and graphics from the flash memory 215.

FIGS. 6 through 15 illustrate examples of screens presented by the GUI 235 during operation of the smart switch 120. The examples illustrated are for controlling an example lighting system that includes sixteen (16) lighting groups and eight (8) presets (predetermined settings for various light fixtures in the lighting system). It should be understood that embodiments of the smart switch 120 may be used to control more or fewer groups and include more or fewer presets. The examples presented are default configurations only, and should not be considered limiting.

When the smart switch 120 powers on (for example, upon being plugged into the bus or after a soft reset), it attempts to establish communications with the NX system (for example, over the lighting fixture network 108) or other area controller(s). In some embodiments, during this time, a Connection Screen is displayed that shows the current software version of the smart switch 120 and, once connected, will display the smart port interface board 500 software version. When the area controller connection is established, the Connection Screen is closed and the Primary Screen is shown. In some embodiments, the user can continue to the Primary Screen before the area controller communications are established by pressing on the Connection Screen.

Figure 15:
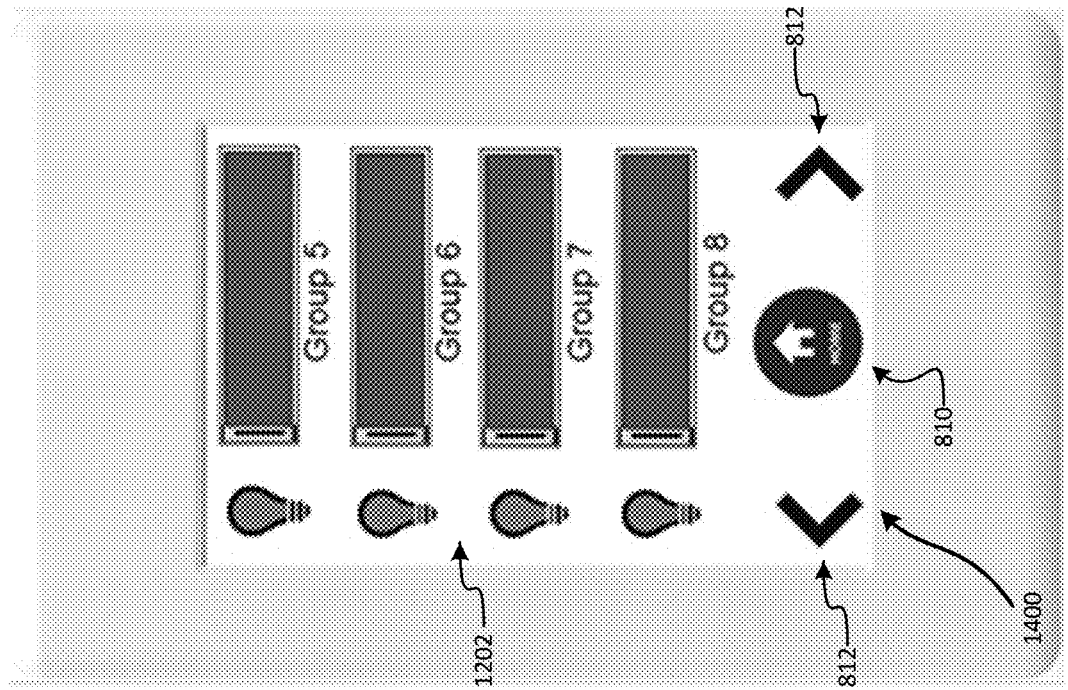
FIG. 15 illustrates a graphical user interface for controlling groups of the lighting control system of FIG. 1, according to some embodiments.
Figure 14:
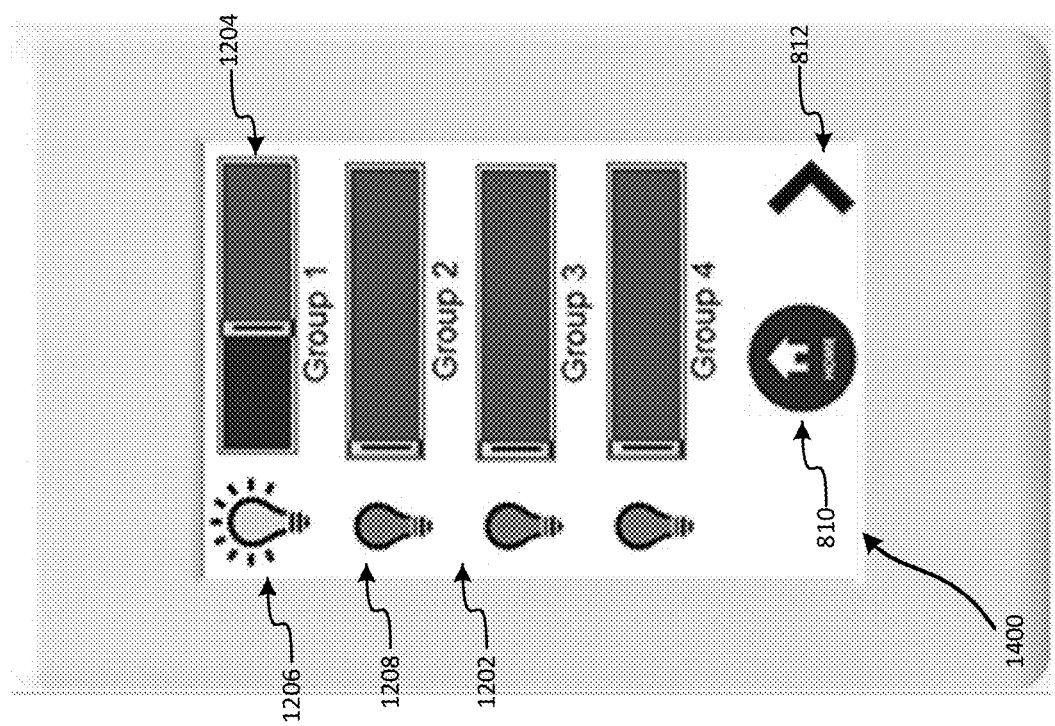
FIG. 14 illustrates a graphical user interface for controlling groups of the lighting control system of FIG. 1, according to some embodiments.

The Primary Screen is the first screen displayed after establishing an area controller connection or after waking the smart switch 120 from sleep mode. The Primary Screen may be one of a Home Screen (FIG. 7), a Master Screen (FIGS. 8, 10, 11), a Presets Screen (FIGS. 12, 13), or Groups Screen (FIGS. 14, 15). Which screen is presented as the Primary Screen is configurable via a configuration file. In some embodiments, the Home Screen is the default Primary Screen.

In some embodiments, access to the Primary Screen is protected by a password or personal identification number, which must be entered (for example, via a keypad generated on the screen) before the Primary Screen is displayed.

Figure 7:
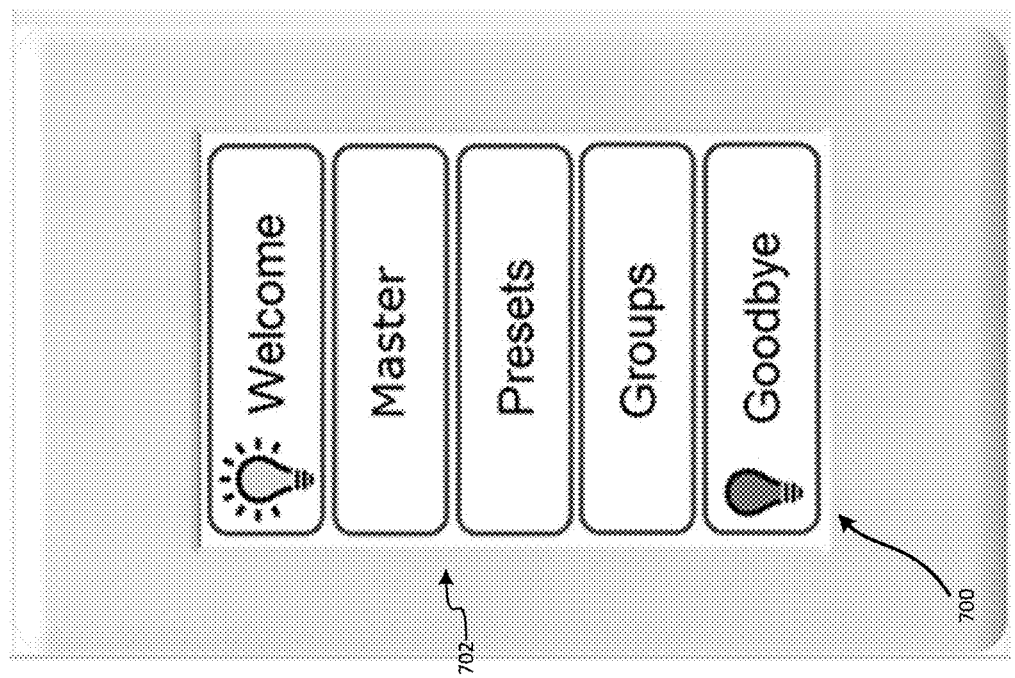
FIG. 7 illustrates a graphical user interface for selecting lighting control functions, according to some embodiments.

FIG. 7 illustrates an embodiment of the Home Screen 700. The Home Screen 700 includes a plurality of buttons 702. The plurality of buttons 702 are virtual buttons presented on a GUI, which may be selected by a user through tapping, touching, pressing, dragging, swiping, or another suitable touch screen gesture. The number of buttons and the function of each of the buttons may be specified in the configuration files. Button functions include launching a screen, initiating a preset, and sending a command to a list of groups (for example, groups of lighting fixtures). Buttons may include text, icons, or both, as specified in the configuration files. In some embodiments, buttons support multiple lines of text. In some embodiments, the buttons include animations. As illustrated in FIG. 7, an example plurality of buttons 702 include a Welcome button, a Master button, a Presets button, a Groups button, and a Goodbye button. Other configurations may include fewer or different buttons, or the same buttons presented in a different order.

In some embodiments, access to one or more buttons on the Home Screen is protected by a password, pattern, or personal identification number, which must be entered (for example, via a virtual keypad generated on the screen) before the function or navigation of the button is executed.

The Welcome button provides a single-action access to the entire system. For example, when selected, it sends an 'ON' command to lighting groups 1-16.

The Master button, when selected, navigates to the Master Screen.

The Presets button, when selected, navigates to the first Presets Screen.

The Groups button, when selected, navigates to the first Groups Screen.

The Goodbye button provides a single-action access to the entire system. For example, when selected, it sends an 'OFF' command to lighting groups 1-16.

Custom buttons (not illustrated) provide access to specific actions from the Home Screen. For example, frequently-used groups, or the light fixtures in the room in which the switch is mounted, may be given a dedicated button on the Home Screen so that access to those lighting controls does not require navigating multiple levels.

Figure 8:
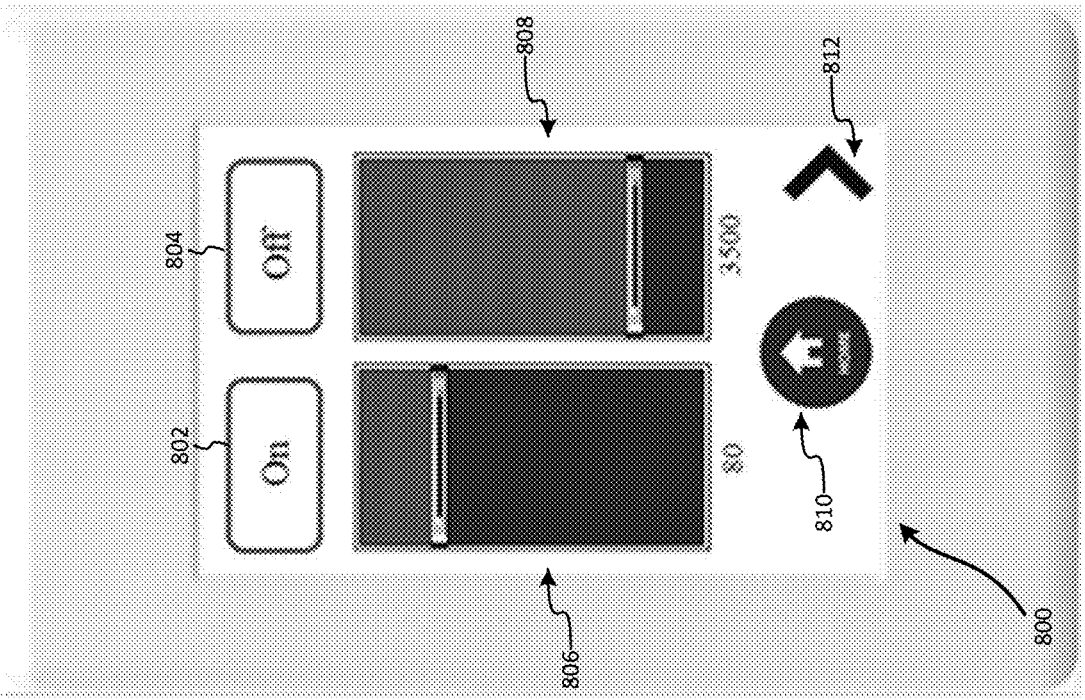
FIG. 8 illustrates a graphical user interface for controlling lighting fixture brightness and correlated color temperature, according to some embodiments.
Figure 11:
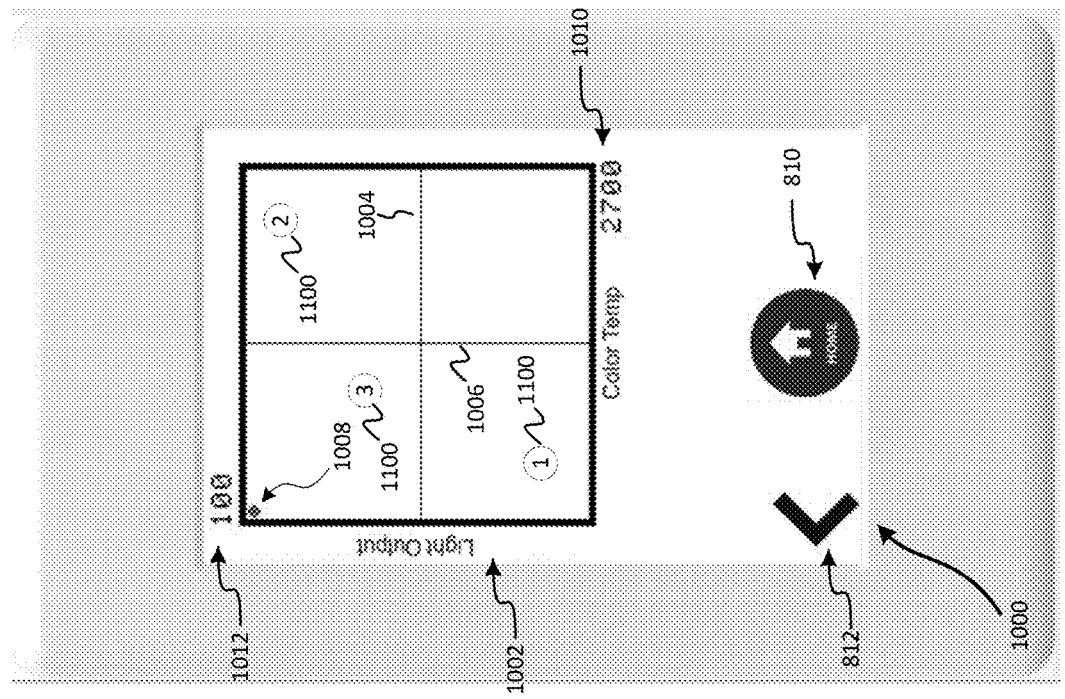
FIG. 11 illustrates a graphical user interface for controlling lighting fixture brightness and correlated color temperature, according to some embodiments.

FIG. 8 illustrates an example Master Screen 800 for controlling lighting fixture brightness and correlated color temperature. The Master Screen 800 is displayed in response to a user selecting the Master button on the Home Screen. Master Screens allow control of a configurable list of lighting groups. Configuration files indicate which groups are controlled by the Master Screen. The groups can be controlled by changing the Dimming Level (brightness), correlated color temperature (CCT), and the On/Off power state. The Master Screen 800 includes an On button 802, an Off button 804, a dimmer control 806, and a CCT control 808. In the illustrated embodiment, the dimmer control 806 and the CCT control 808 are slider controls. As illustrated in FIG. 8, in some embodiments, the Master Screen 800 also indicates the dimmer level and CCT value numerically.

Figure 9:
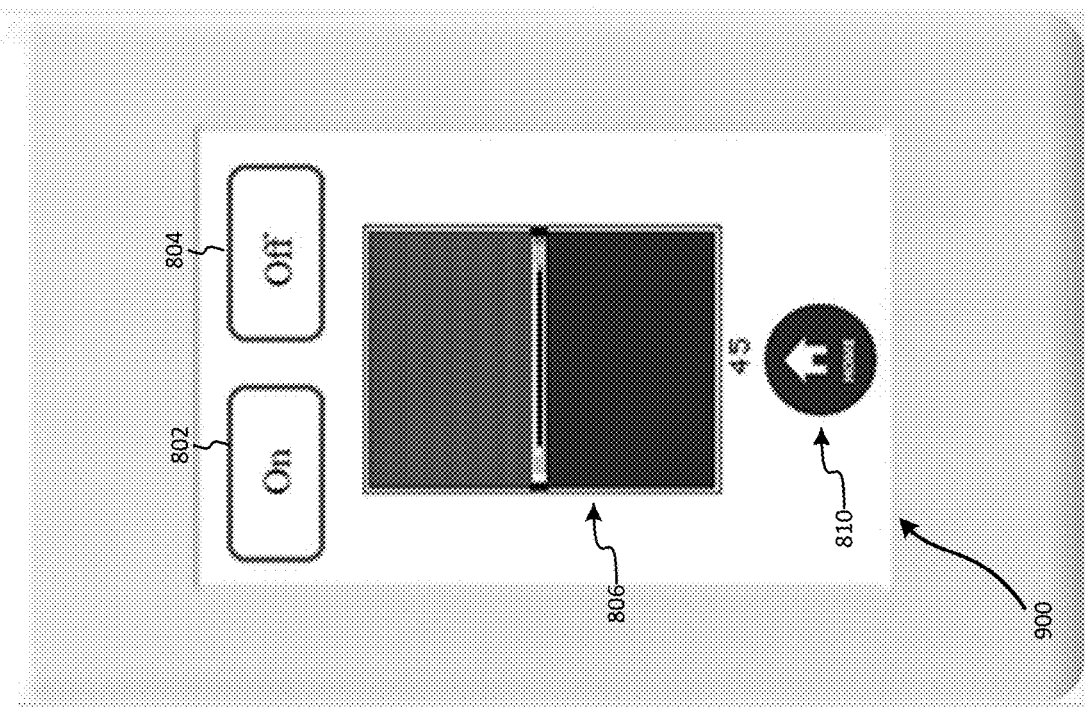
FIG. 9 illustrates a graphical user interface for controlling lighting fixture brightness according to some embodiments.

The Master Screen 800 also includes a home button 810 and a navigation button 812. The home button 810, when selected, will return to the Home Screen. The navigation button 812, when selected, advances to the next or previous Master Screen. Master Screen 800 is presented when the fixtures in the controlled groups have adjustable CCT enabled. When CCT capability is not enabled, the Master Screen includes only the dimmer control 806. As illustrated in FIG. 9, in some embodiments, the dimmer control 806 is presented in a larger format when it is the only control presented.

Figure 10:
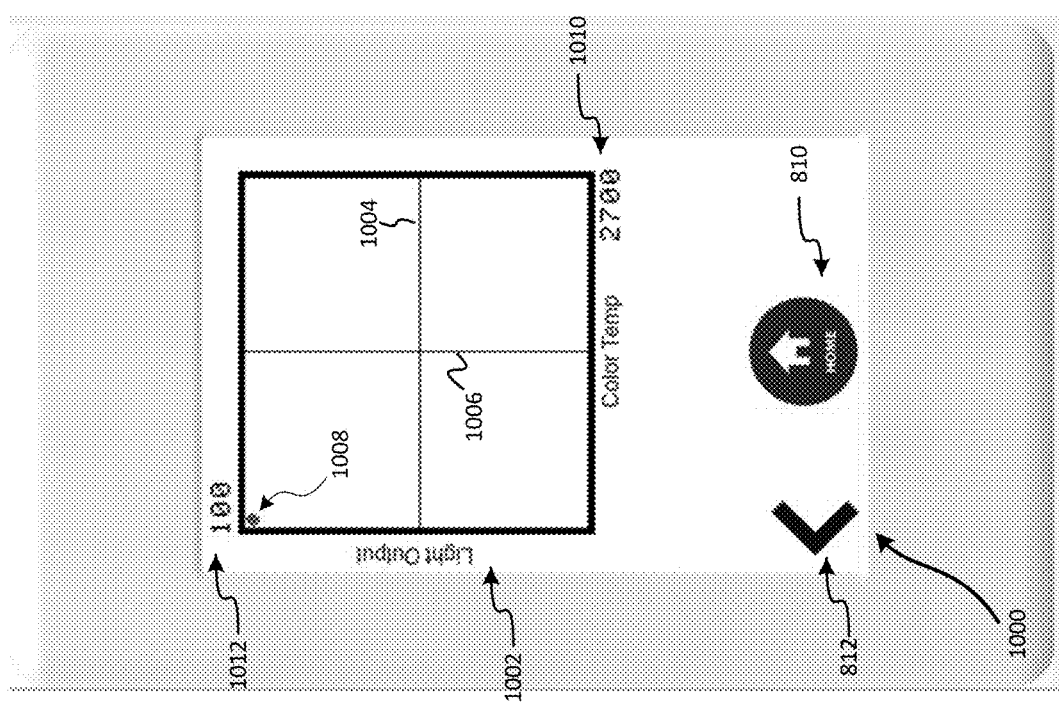
FIG. 10 illustrates a graphical user interface for controlling lighting fixture brightness and correlated color temperature, according to some embodiments.
Figure 13:
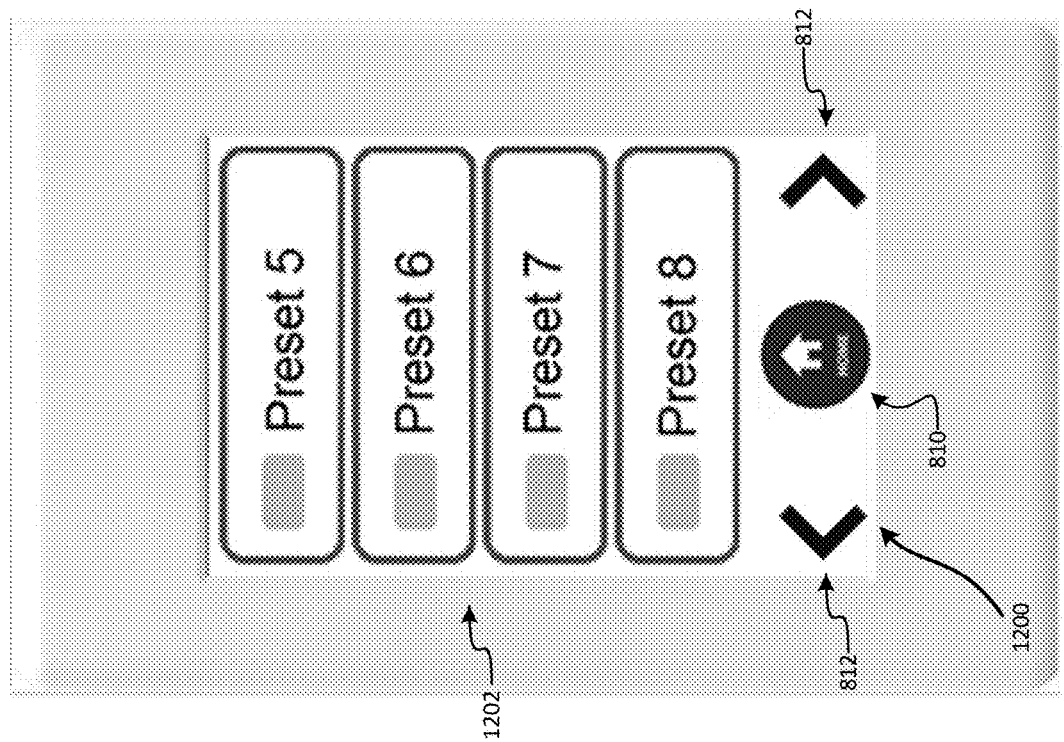
FIG. 13 illustrates a graphical user interface for selecting lighting control system presets, according to some embodiments.

FIG. 10 illustrates another example Master Screen 1000 for controlling lighting fixture brightness and correlated color temperature. The Master Screen 1000 includes a combined control 1002. The combined control 1002 allows simultaneous dual control of dimmer levels and CCT through the use of a single control mechanism, rather than using two sliders, as with the Master Screen 800. The combined control 1002 includes an x-axis 1004 and a y-axis 1006. The position of the selector dot 1008 sets and indicates the dimmer level and CCT value simultaneously. The x-axis 1004 represents the CCT value range (for example, from 2700K (warm white light) to 6500K (daylight)). The y-axis 1006 represents the dimmer level range (for example, from 0 to 100%). In the embodiment illustrated, the selector dot 1008 is selecting a dimmer level of 100% and a CCT value of 2700K. As illustrated in FIG. 8, in some embodiments, the Master Screen 1000 also includes a dimmer level numerical indicator 1012 and a CCT value numerical indicator 1010.

In some embodiments, the selector dot 1008 is pressed and dragged to select an x-y coordinate on the combined control 1002. In some embodiments, a press or touch at an x-y coordinate on the combined control 1002 will move the selector dot 1008 to that position. Some embodiments include both selection mechanisms. In some embodiments, the dimmer level and CCT value for the lighting group being controlled are adjusted on the fly as the selector dot 1008 is dragged within the combined control 1002, allowing a user to dynamically adjust the lighting to suit his or her desired levels.

In some embodiments, the combined control 1002 includes the ability to set and indicate favorite settings. For example, in the embodiment illustrated in FIG. 11, three favorites 1100 are indicated in the combined control 1002. In some embodiments, the favorites are pre-defined in configuration files. In some embodiments, the favorites are factory-populated, and correspond to recommended settings based on activities (for example, watching a movie, working, nighttime, and the like). In some embodiments, a user can create a favorite setting by pressing and holding a location on the combined control 1002 for some period of time. In some embodiments, a combination of approaches is used. In some embodiments, a favorite can be selected and dragged to a new location to adjust its setting. In some embodiments, when one of the favorites is selected, the selector dot 1008 moves to the location of the selected favorite. In some embodiments, when a user drags the selector within a predetermined distance of a favorite, the selector dot 1008 snaps to the location of the nearby favorite. In some embodiments, one or more favorites correspond to presets identified in the Presets Screen.

Figure 12:
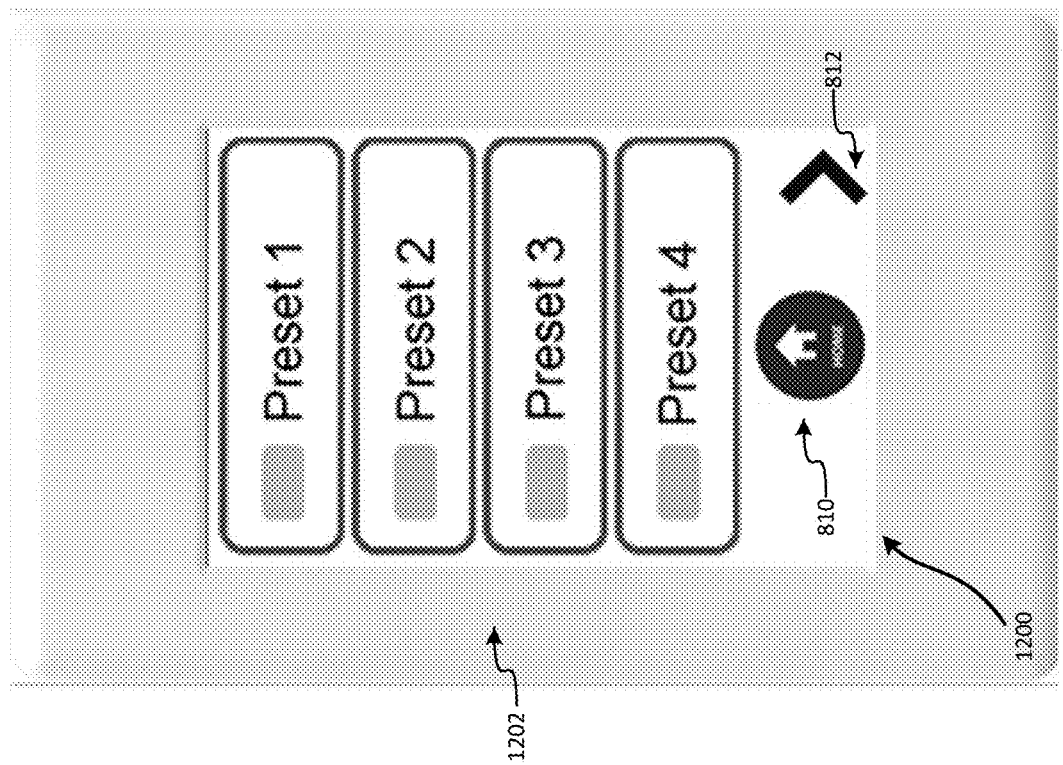
FIG. 12 illustrates a graphical user interface for selecting lighting control system presets, according to some embodiments.

FIG. 12 illustrates an example Preset Screen 1200 for selecting lighting control system presets. The Preset Screen 1200 includes a plurality of Preset buttons 1202. Each of the buttons corresponds to a Preset of the system 100 (for example, as defined in the room controller 112). Navigation buttons 812 are provided for scrolling through multiple Preset Screens, as needed (for example, see FIG. 13).

FIG. 14 illustrates an example Group Screen 1400 for controlling groups of the lighting control system 100. In the illustrated embodiment, the Group Screen 1400 includes a plurality of group controls 1202. In the illustrated embodiment, the group controls include a slider (for example, the group slider 1204) for controlling the dimmer level of the group assigned to the group control. In the illustrated embodiment, each control also includes an icon. For example, a lit bulb 1206 may indicate that the lighting fixtures of Group 1 are active, while a grayed out bulb 1208) may indicate that the lighting fixtures of Group 2 are inactive. In some embodiments, each icon may vary in brightness corresponding to the dimmer level for its group. Navigation buttons 812 are provided for scrolling through multiple Group Screens, as needed (for example, see FIG. 15).

In some embodiments, the smart switch 120 includes a sleep mode. For example, after a period of inactivity, the smart switch 120 will enter a sleep mode that causes a screen saver image to be displayed on the display screen 230. In some embodiments, the sleep mode will blank the display screen 230. In some embodiments, the screen brightness can be reduced for lower power consumption. In some embodiments, any touch will wake the smart switch 120 and return to the Primary Screen. The screen brightness during sleep, the inactivity time, and screen saver theme are configurable by settings in the configuration files. In some embodiments, it may be desirable to keep the brightness level high enough to function as a "night light" so that the control can be found easily in a dark room. In some embodiments, to generate more light output to assist users with locating the smart switch 120 in a dark room, a white frame is drawn around the perimeter of the sleep screen. In some embodiments, a password or PIN must be entered, as described above, when the smart switch 120 is awakened from sleep mode.

In some embodiments, the smart switch 120 polls the devices of the system 100 for status changes. For example, the system 100 may include other control means for the lighting fixtures in a group also controlled by the smart switch 120. When the other control means adjusts a status of the lighting fixtures, the smart switch 120 can also adjust its status (for example, but moving a slider control image to reflect a new dimmer level for a lighting group that was set by a room controller using an occupancy sensor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A system comprising:
    an electronic processor;
    a transceiver communicatively coupled to the electronic processor;
    a display communicatively coupled to the electronic processor; and
    a non-transient memory medium communicatively coupled to the electronic processor;
    wherein the electronic processor is configured to
        generate a graphical representation based on at least one configuration file, wherein the configuration file identifies the graphical representation selected from among a plurality of graphical representations presented to a user,
        present the graphical representation on the display,
        receive at least one updated configuration file,
        generate, based on the graphical representation and the updated configuration file, an updated graphical representation including control functionality based on the updated configuration file,
        present, on the display, the updated graphical representation,
        receive a user input indicative of a selection, and
        transmit, via the transceiver, a lighting system control command based the selection.

2. The system of claim 1, wherein electronic processor is further configured to in response to determining that at least one configuration file is not on the non-transient memory medium,
    generate at least one default configuration file,
    write the at least one default configuration file to the non-transient memory medium, and
    generate the graphical representation based on the at least one default configuration file.

3. The system of claim 1, wherein electronic processor is further configured to in response to determining that at least one configuration file is not present on the non-transient memory medium,
    transmit, via the transceiver, a device polling request,
    receive, via the transceiver, at least one device polling response including at least one device capability, and
    generate the at least one default configuration file based on the at least one device polling response.

4. The system of claim 1, wherein the lighting system control command controls one or more lighting fixtures.

5. The system of claim 4, wherein the one or more lighting fixtures are associated with one or more zones.

6. The system of claim 1, wherein the non-transient memory medium is portable.

7. The system of claim 1, wherein the configuration file is stored on the non-transient memory medium.

8. The system of claim 7, wherein the configuration file is received by the non-transient memory medium from an external device.

9. The system of claim 8, wherein the external device is at least one selected from a smartphone, a tablet, an external computer.

10. The system of claim 8, wherein the configuration file is received via at least one selected from a group consisting of a network, a wired connection, a wireless connection, a short message service (SMS).

11. A system comprising:
an electronic processor;
a transceiver communicatively coupled to the electronic processor;
a display communicatively coupled to the electronic processor; and
a non-transient memory medium communicatively coupled to the electronic processor;
wherein the electronic processor is configured to
retrieve, from the non-transient memory medium, the at least one configuration file,
generate a graphical representation based on the at least one configuration file, the graphical representation including a combined control, the combined control including an x-axis, a y-axis, and a selector dot positioned at a first position,
present the graphical representation on the display,
receive a user input indicative of an x value and a y value,
generate an updated graphical representation based on the user input, wherein the selector dot is positioned at a second position based on the x value and the y value,
present, on the display, the updated graphical representation, and
transmit, via the transceiver, a lighting system control command, the lighting system control command including a correlated color temperature value based on the x value and a dimmer level based on the y value.

12. The system of claim 11, wherein the lighting system control command controls one or more lighting fixtures.

13. The system of claim 11, wherein the one or more lighting fixtures are associated with one or more zones.

14. The system of claim 11, wherein the electronic processor is further configured to
retrieve, from the non-transient memory medium, a preset including a predetermined correlated color temperature value and a predetermined dimmer level;
generate the graphical representation to further include a favorite settings indicator, positioned at a third position based on the predetermined correlated color temperature value and the predetermined dimmer level; and
receive a second user input indicative of selecting the favorite settings indicator,
generate a second updated graphical representation based on the second user input, wherein the selector dot is positioned at a third position,
present, on the display, the updated graphical representation, and
transmit, via the transceiver, a lighting system control command, the lighting system control command including the predetermined correlated color temperature value and the predetermined dimmer level.

15. The system of claim 11, wherein non-transient memory medium is portable.

16. The system of claim 11, wherein the configuration file is stored on the non-transient memory medium.

17. The system of claim 16, wherein the configuration file is received by the non-transient memory medium from an external device.

18. The system of claim 17, wherein the external device is at least one selected from a smartphone, a tablet, an external computer.

19. The system of claim 17, wherein the configuration file is received via at least one selected from a group consisting of a network, a wired connection, a wireless connection, a short message service (SMS).

* * * * *